(12) United States Patent
Shi et al.

(10) Patent No.: US 6,664,818 B1
(45) Date of Patent: Dec. 16, 2003

(54) CURRENT CONTROLLED SIGMOID NEURAL CIRCUIT

(75) Inventors: Bingxue Shi, Hsinchu (TW); Lu Chen, Hsinchu (TW); Chun Lu, Hsinchu (TW)

(73) Assignee: Winbond Electronics Corporation, Hsinchu (TW)

( * ) Notice: Subject to any disclaimer, the term of this patent is extended or adjusted under 35 U.S.C. 154(b) by 0 days.

(21) Appl. No.: 10/292,441

(22) Filed: Nov. 13, 2002

(51) Int. Cl.$^7$ ............................................. H02M 11/00
(52) U.S. Cl. ........................................ 327/103; 706/33
(58) Field of Search ...................... 327/103, 334–336, 327/89; 326/35–36; 706/33, 38, 41, 44

(56) References Cited

U.S. PATENT DOCUMENTS 5,309,036 A * 5/1994 Yang et al. ................. 327/110
5,648,926 A * 7/1997 Douglas et al. ............. 708/801
5,745,655 A * 4/1998 Chung et al. ................. 706/33
6,429,699 B1 * 8/2002 Shi et al.

* cited by examiner

Primary Examiner—My-Trang Nuton
(74) Attorney, Agent, or Firm—Rosenberg, Klein & Lee

(57) ABSTRACT

The current controlled sigmoid neural circuit is used for approximating sigmoid function and is simple constructed, current controlled and gain adjustable circuit with highly precision. The present invention comprises a voltage generator for converting a current input into a voltage, a pair of differential amplifier for generating sigmoid-like function and few pairs of current mirrors for providing reference currents. By using adjustable reference current and gain factor, the circuit has a large range and high noise immunity and can approximate sigmoid function with insignificant error.

10 Claims, 3 Drawing Sheets

US 6,664,818 B1

CURRENT CONTROLLED SIGMOID NEURAL CIRCUIT

BACKGROUND OF THE INVENTION

1. Field of the Invention

This invention generally relates to a neural circuit, and more particularly a neural circuit which is used for approximating sigmoid function.

2. Description of the Prior Art

Neural networks are mathematical models that are inspired by the connections and the functioning of neurons in biological systems. Neural networks have given rise to a branch of research called neural computing, being used or tried out in many disciplines. The basic concept is based on two simple concepts, the topology of nodes and connections between them, and transfer functions which relate the input and output of each node. A node receives input data through its input connections, performs a very simple operation on these (weighted sum and some kind of thresholding function), and passes the result on its output connection(s), as final output or for use in other nodes.

The inherent simplicity of Neural networks suggests that massive parallelism and possibly special, very simple hardware can be taken advantage of in the implementation of. Neural networks, e.g. semiconductors or optical elements. More relevant than implementation questions, however, appears to be the understanding of the virtues and pitfalls of Neural networks as algorithms. One of their important properties is that they can be trained, i.e. they can be given training samples of events of different classes, and by learning algorithms of various complications, can adjust the weights associated to all input connections until some overall function is maximized which characterizes the quality of the decision mechanism. The optimization is often viewed in analogy with the minimizing of a physical potential (Boltzmann machine); the function is then termed an "energy function". There are functions such as thresholding function, linearly separable function and sigmoid functions, which can approximate the energy function. Among the three, the sigmoid function is most widely used because it can be implemented by simple multiplier and is very applicable using back-propagation learning which can adjust weights to improve discrimination when input data is incomplete or noisy.

One structure of a conventional neuron circuit for approximating energy function includes a simple circuit for comparing two electrical quantities provided by a nonlinear voltage saved within "off-chip digital RAM" and a reference source. Though the circuit with this structure can result in an energy function, it needs a lot of external inputs, hence increases circuit complexity and makes it unavailable to be implemented in VLSI technology. Another structure of neuron circuit for approximating energy function includes dual-transistor amplifier with low gains. The transfer function of the circuit with this structure can not generate sigmoid-like function correctly therefore this circuit is not applicable using back-propagation learning. There's also another neuron circuit which is made from transistors. By utilizing the characteristic of transistors, this circuit can approximate sigmoid function perfectly but still, it needs complexity of BICOMS technologies and its gain is unable to be adjusted.

In accordance with the above description, a new and improved neural circuit which is simple constructed, current controlled and gain adjustable with high precision is therefore necessary, so as to approximate sigmoid function with insignificant error.

SUMMARY OF THE INVENTION

In accordance with the present invention, a neural circuit is provided that substantially overcomes the drawbacks of the above mentioned problems when approximating sigmoid function.

Accordingly, it is one object of the present invention to provide a sigmoid neural circuit which is simple constructed and is able to be implemented for VLSI manufacturing.

It is another object for present invention to provide a neural sigmoid circuit which can generate sigmoid-like function with insignificant error and enable the result of the circuit to be used by back-propagation learning.

It is still another object for present invention to provide a neural sigmoid circuit which is gain adjustable and won't increase complexity of the circuit.

According to the foregoing objectives, the present invention provides a simple neuron circuit design and it can generate sigmoid-like function with errorless effect so as to fit for back-propagation learning. By using adjustable threshold and gain factor, the circuit has a large range and high noise immunity.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

The present invention provides a neural circuit, and more particularly a neural circuit which is used for approximating sigmoid function and is simple constructed, current controlled and gain adjustable circuit with highly precision.

Figure 1:
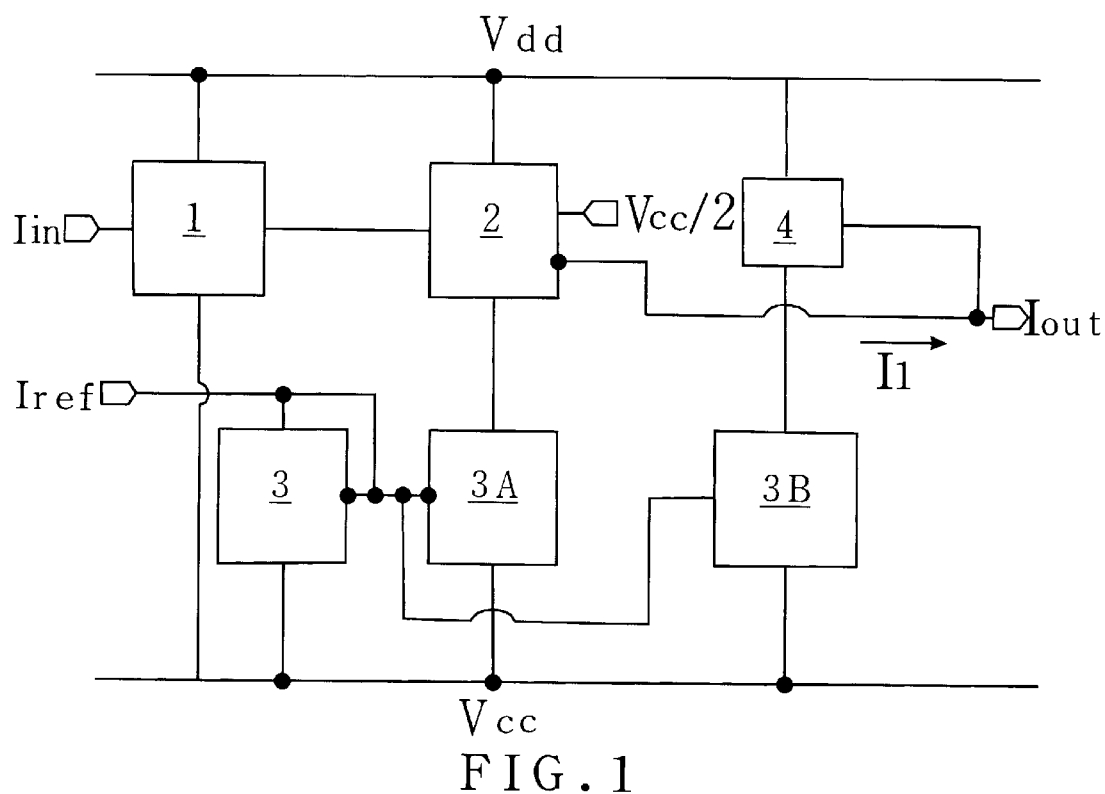
FIG. 1 shows the block diagram of the current controlled sigmoid neural circuit.

FIG. 1 is shown the block diagram of the current controlled sigmoid neural circuit with a voltage generator 1 which is used for converting a input current into a output voltage, three current mirrors(3 3A ,3 3B, 4) used for providing a first replicated current and one CMOS differential amplifier 2 used for generating a sigmoid-like function. Also there are an input current $I_{in}$, a reference current $I_{ref}$, and one output current $I_{out}$.

Figure 2:
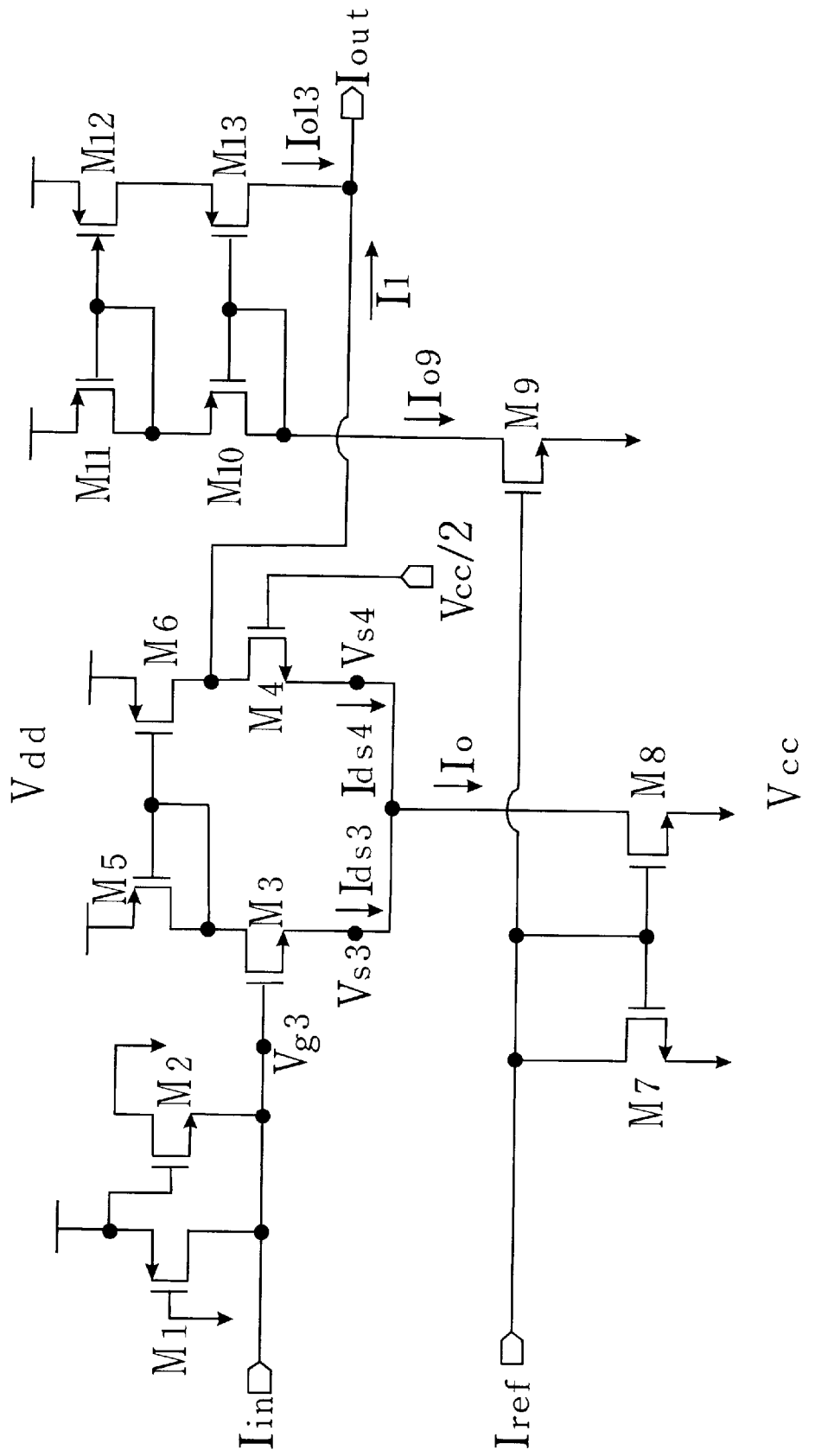
FIG. 2 shows the circuit diagram of the current controlled sigmoid neural circuit.

FIG. 2 shows the detail circuit within the blocks of FIG. 1; the circuit diagram of the current controlled sigmoid neural circuit comprises a pair of differential amplifier and few pairs of current mirrors. As shown, the voltage generator (1) includes a first input terminal for receiving a first reference voltage $V_{dd}$, a second input terminal for receiving a second reference voltage $V_{cc}$, and a third input terminal for receiving a third input current $I_{in}$. The first transistor (M1) has drain and source connected to the third input current $I_{in}$, and first reference voltage $V_{dd}$, respectively, and gate connected to the second input terminal $V_{cc}$. The second transistor (M2) has drain and source connected to the second input terminal $V_{cc}$ and the third input current $I_{in}$, respectively, and gate connected to the first input terminal $V_{dd}$, wherein M1 and M2 are complementary pair of transistors.

As shown, there's a first current mirror (3, 3A) which is made from a pair of back to back n-channel transistors (M7, M8) with their input ports connected in parallel. It has an input reference current $I_{ref}$ and a replicated current $I_o$, simulated by the input reference current $I_{ref}$.

A differential amplifier (2) is made from CMOS, wherein the p-channel MOSFETs (M5, M6) and n-channel MOSFETs (M3, M4) have the same small-signal model, exhibiting controlled current behavior. Two p-channel MOSFETs (M5, M6) are used for load devices, and the other two n-channel MOSFETs (M3, M4) are used for driven devices with a bias-leg current provided by the replicated current $I_o$ of the first current mirror (3, 3A). It has two inputs connected to the output voltage $V_{g3}$ of resistor circuit section and a voltage source $V_{cc}/2$ respectively. It has one current output $I_{out}$ which is a differential current of the differential amplifiers 2.

A second current mirror (3, 3B) is made from a pair of back to back n-channel transistors (M7, M9) with their input ports connected in parallel. It has an input reference $I_{ref}$ current and a replicated current $I_{o9}$ simulated by the input reference current $I_{ref}$ of the second current mirror (3, 3B). A third current mirror (4) is made from two pair of back to back p-channel transistors (M10, M11, M12, and M13).with their input ports connected in parallel. It has an input reference current $I_{o9}$ provided by said replicated current of the second current mirror (3, 3B) and an output current $I_{o13}$ which is a replicated current simulated by the input reference current $I_{o9}$ of said third current mirror (4).

Finally, there's a output current $I_{out}$ which is the sum of said output current $I_{o13}$ of the third current mirror (4) and the current output $I_1$ of differential amplifier (2).

As shown in FIG. 2, wherein when M1 and M2 are operating in the triode region, the combination of M1 and M2 becomes a resistor of the input current $I_{in}$. The existence of M1 and: M2 is to convert the input current source $I_{in}$ into a voltage source $V_{g3}$, so as to provide the differential amplifier (2) an input voltage $V_{g3}$.

When $I_{in}$ equals zero, based on the bias of M1 and M2, $V_{g3}$ will equal $V_{cc}/2$. It also shows that M3 and M4 make a driven device and M5 and M6 make a load device. Suppose the equivalent resistance of M1 and M2 are both R, then we will have $$V_{g3} = \frac{V_{cc}}{2} + \frac{R \cdot I_{in}}{2}$$

Due to M3 and M4 are operating in the saturation region, the current flow drain to source of M3 and M4 are:

$$I_{ds3} = \frac{1}{2}\beta_3(V_{g3} - V_{s3} - V_{TN})^2$$

$$I_{ds4} = \frac{1}{2}\beta_4(V_{g4} - V_{s4} - V_{TN})^2$$

where $$\beta_3 = \mu_N C_{OX}\left(\frac{W}{L}\right)_{M_3} = \beta_4 = \mu_N C_{OX}\left(\frac{W}{L}\right)_{M_4}$$

where $V_{S3}=V_{S4}$ and because of the first current mirror, $I_o$ equals $I_{ref}$. $I_{ds3}+I_{ds4}=I_{ref}$. the current difference $I_1$ between $I_{ds3}$ and $I_{ds4}$ is, $$I_1 = I_{ds3} - I_{ds4} =$$

$$\frac{1}{2}\beta_3(V_{g3} - V_{g4})\sqrt{\frac{4I_{ref}}{\beta_3} - (V_{g3} - V_{g4})^2} = \frac{\beta_3^R I_{in}}{4}\sqrt{\frac{4I_{ref}}{\beta_3} - \frac{R^2 I_{in}^2}{4}}$$

therefore, the output current $I_{out}$ could be represented as $$I_{out} = I_1 + I_{ref} = \frac{\beta_3^R I_{in}}{4}\sqrt{\frac{4I_{ref}}{\beta_3} - \frac{R^2 I_{in}^2}{4}} + I_{ref}$$

The derivation above is effective under the small signal modeling, and the current gain between $I_{in}$, and $I_{out}$ can approximate to sigmoid function. When under bias configuration, the input source of the driven device is $I_{ref}$, so the range of differential current between M3 and M4 is $-I_{ref} \sim I_{ref}$. It is said that the range of output current $I_o$ is 0~2 $I_{ref}$. Therefore, by adjusting the value of $I_{ref}$ through the sigmoid function, the output current $I_o$ can be changed, so can the gain of sigmoid function.

Figure 3:
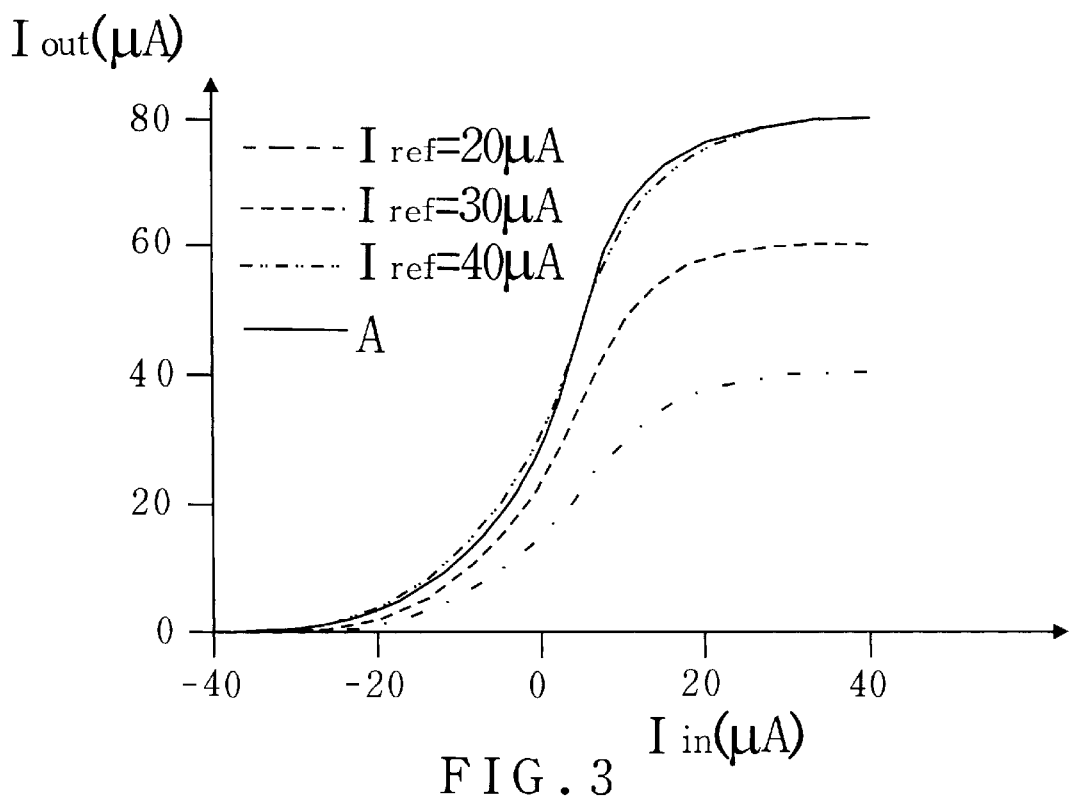
FIG. 3 shows the relationship between input current $I_{in}$ and output current $I_{out}$.

FIG. 3 shows the transfer function of the current controlled sigmoid neural circuit whereof the transistors are fabricated with 1.2 μm Spectre Model. The three other curves represent three different relationships between $I_{in}$ and $I_{out}$ under three different $I_{ref}$. The curve A represents a fitted sigmoide curve. It shows that both the current gain and output current range depend on the value of $I_{ref}$. It also can be shown that the curve with $I_{ref}$ equals to 40 μA is almost matched with the fitted sigmoide curve and the sigmoidal transfer function with $I_{ref}$=40 μA can be represented by $$I_{out} = \frac{80}{1 + \exp\left(\frac{-I_{in}(\mu A)}{7}\right)}$$

By numerical analysis it can be seen that with the $I_{ref}$ equals to 40 μA, there exists an relative error between fitted sigmoide curve and experimental result of not more than 3% so the circuit with $I_{ref}$ equals to 40 μA, has a better approximation.

Figure 4:
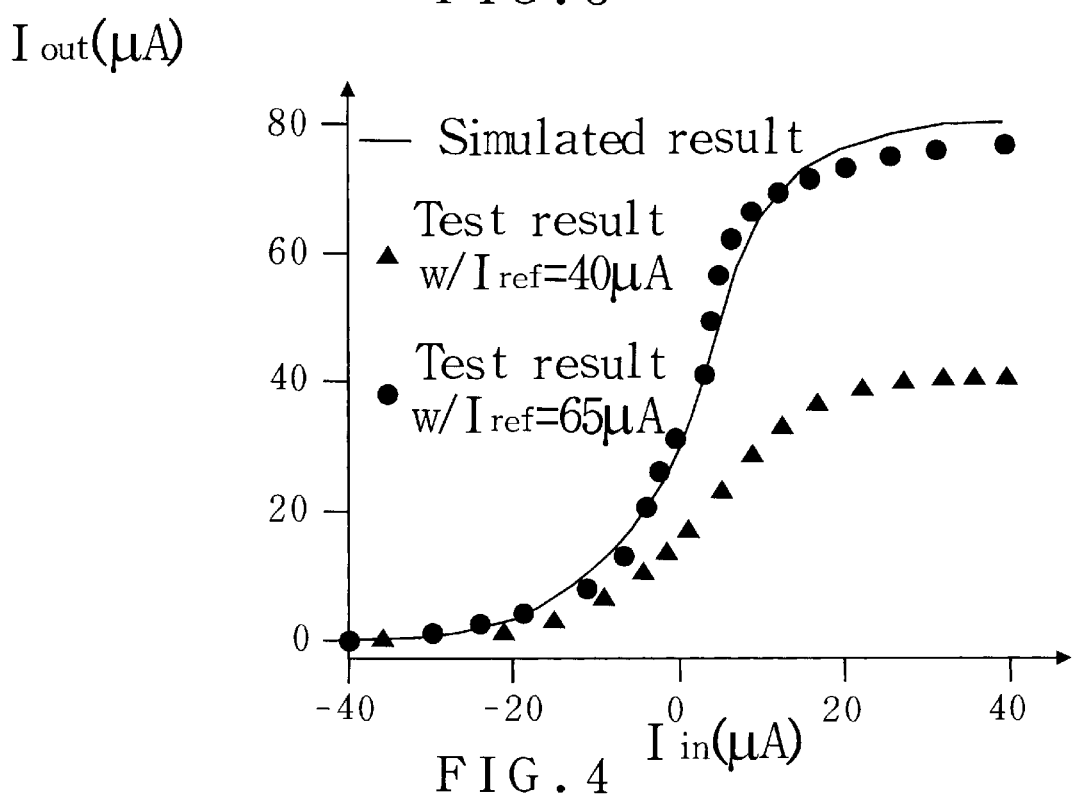
FIG. 4 shows the test result of the current controlled sigmoid neural circuit.

A current controlled sigmoid neural circuit with the transistors fabricated with 1.2 μm Spectre Model which has circuit size (core area) of 170×120 μm and its characteristics of transfer function is shown in FIG. 4 wherein the simulated result and the test results are both under the condition of $I_{ref}$ equals to 40 μA. It shows that the output current of the test result is smaller than that of the simulated result and what is caused by the inaccuracy of the current mirror and the device model. Though there's an error caused by the inaccuracy of the current mirror and device model, it can be overcome by increasing the $I_{ref}$ to 65 μA. As shown in FIG. 4, the test result with $I_{ref}$ increasing to 65 μA will has a better approximation with the simulated result than that with $I_{ref}$ equals to 40 μA.

As above mentioned, the present invention provides a simple neuron circuit design and it can generate sigmoid-like function with errorless effect so as to fit for back-propagation learning. By using adjustable threshold and gainfactor, the circuit has a large range and high noise immunity.

Although the present invention has been described in its preferred embodiment, it is not intended to limit the invention to the precise embodiment disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A current controlled sigmoid neural circuit comprising:
   a first input terminal for receiving a reference voltage;
   a second input terminal for receiving a second reference voltage;
   a second input terminal for ireceiving-athird input current;
   a third input terminal for receiving a third input current;
   an output terminal for outputting a current;
   a voltage generator coupled to the first, second and third input terminals for converting an input current into an output voltage;
   a differential amplifier coupled to the voltage generator for generting a sigmoid-like function;
   a first current mirror for providing a first replicated current simulated by said input reference current for said differential amplifier;
   a second current mirror for providing a second replicated current simulated by said input reference current for a third current mirror, where said third current mirror is for providing an output current to the output terminal.

2. The current controlled sigmoid neural circuit according to claim 1, wherein the voltage generator is a complementary pair of transistors, a first p-channel transistors and a second n-channel transistor, said first transistor having drain connected to the third input current, source connected to the first reference voltage, and gate connected to the second input terminal, said second transistor having drain connected to said second input terminal, source connected to said third input current, and gate connected to the first input terminal.

3. The current controlled sigmoid neural circuit according to claim 1, wherein said first current mirror made from a pair of back to back n-channel transistors with their input ports connected in parallel having said input reference current and said replicated current simulated by the input reference current of said first current mirror.

4. The current controlled sigmoid neural circuit according to claim 1, wherein said differential amplifier, made from CMOS wherein the p-channel and n-channel transistors have the same small-signal model, exhibiting controlled current behavior, said two p-channel transistors being used for load devices and two n-channel transistors being used for driven devices with a bias-leg current provided by said replicated current of said first current mirror having an input connected to an external fourth input voltage, and one current output which is a differential current of said differential amplifier.

5. The current controlled sigmoid neural circuit according to claim 1, wherein said second current mirror made from a pair of back to back n-channel transistors with their input ports connected in parallel having said input reference current and said second replicated current simulated by the input reference current of said second current mirror.

6. The current controlled sigmoid neural circuit according to claim 1, wherein said third current mirror includes two pairs of back to back p-channel transistors with their input ports connected in parallel having said input reference current provided by said second replicated current of said second current mirror and an output current which is a replicated current simulated by the input reference current of said third current mirror.

7. The current controlled sigmoid neural circuit according to claim 1, wherein said output current is the sum of said output current of said third current mirror and said current output of said differential amplifier.

8. The current controlled sigmoid neural circuit according to claim 3, wherein said driven device of said differential amplifier comprising two transistors are identified in configuration.

9. The current controlled sigmoid neural circuit according to claim 1, wherein the current gain between said third input current and said output current which can be adjusted by changing a transistors' characteristic of said driven device of said differential amplifier, and said input reference current of said second current mirror.

10. The current controlled sigmoid neural circuit according to claim 1, which is a simple, concise, gain adjustable and with adjustable output range, whereof the relationship between input current and output current can generate sigmoid-like function in small signal modeling.

* * * * *